ated  July 13, 1971

United States Patent

[11] 3,593,127

[72] Inventor Eugene R. Lucka
 Columbus, Ohio
[21] Appl. No. 736,325
[22] Filed June 12, 1968
[45] Patented July 13, 1971
[73] Assignee Reliance Electric and Engineering Company
 Columbus, Ohio

[54] DIRECTIONAL DISPLACEMENT CAPACITIVE PICKUP
 21 Claims, 10 Drawing Figs.

[52] U.S. Cl. .................................................... 324/61
[51] Int. Cl. ................................................ G01n 27/26
[50] Field of Search .......................................... 324/61 P, 61; 317/246

[56] References Cited
 UNITED STATES PATENTS
 3,319,163  5/1967  Thompson ..................... 324/61
 3,031,617  4/1962  Paquette ....................... 324/61
 3,400,331  9/1968  Harris .......................... 324/61
 FOREIGN PATENTS
 204,503  11/1956  Australia ....................... 324/61

OTHER REFERENCES

Foster, G. B. "Noncontacting Self Calibrating Vibration Transducer," in INSTRUMENTS & CONTROL SYSTEMS, Dec. 1963. pp. 83— 84. Q 184.I59

Black, R. H. "A Capacitance Method For Measuring The Thickness Of Thin Water Sheets," in U.S. NAVAL RADIOLOGICAL DEFENSE LABORATORY RESEARCH AND DEVELOPMENT TECHNICAL REPORT USNRDL-TR-315. April 3, 1969. pp. i-iii and 1— 11. (copy in group 258, class 324, sub 61.)

Primary Examiner— Edward E. Kubasiewicz
Attorney— LeBlanc & Shur

ABSTRACT: There is disclosed herein a noncontact proximity-sensitive transducer having improved directional properties formed of an elongated rodlike pickup adapted to provide a distance-sensitive variable capacitance and an annular shielding member fitted onto the end of the pickup. The shielding member includes a conducting plane electrically isolated from the pickup, and maintained at the same electrical potential as the object under inspection. The capacity variation serves as a frequency control element to modulate the output in a high frequency oscillator in accordance with the distance variations being measured.

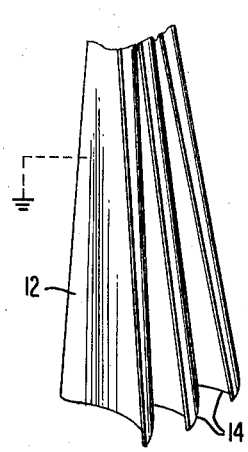
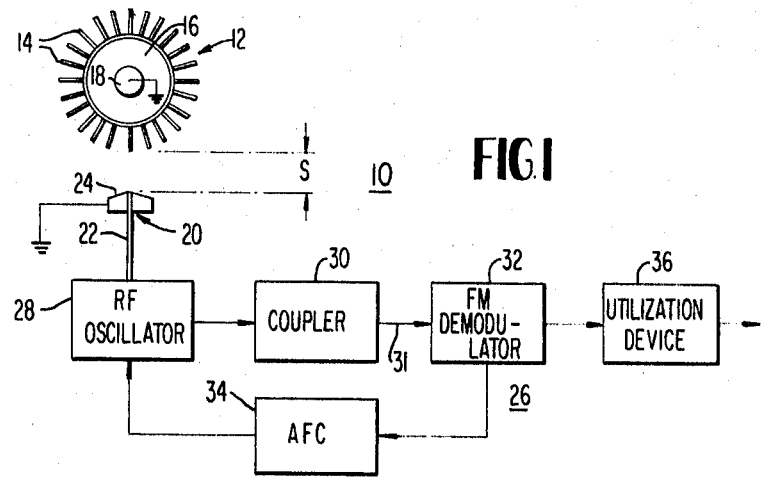
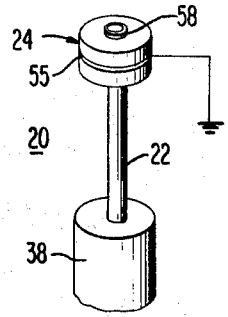
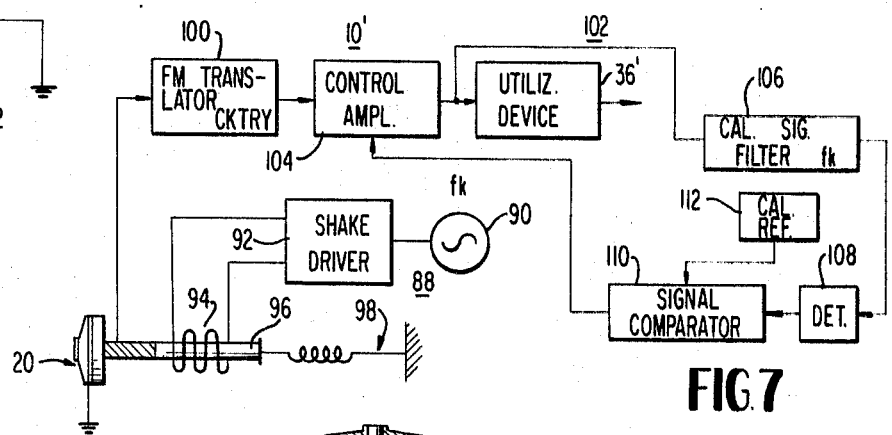
FIG. 1
FIG. 2
FIG. 7
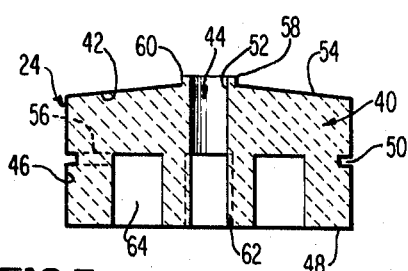
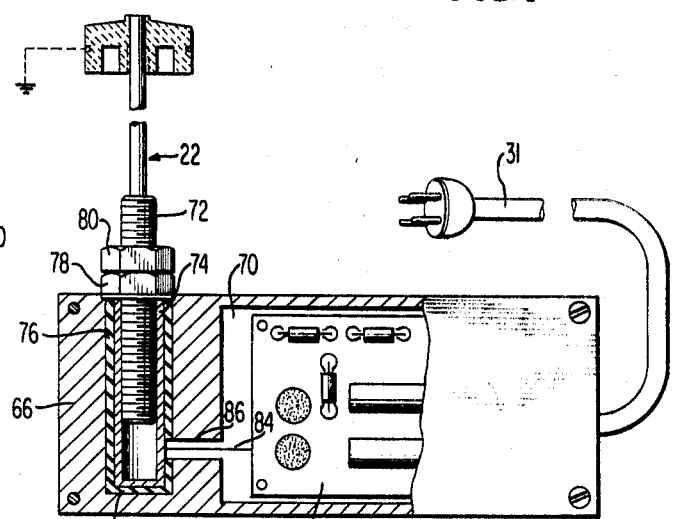
FIG. 3
FIG. 5
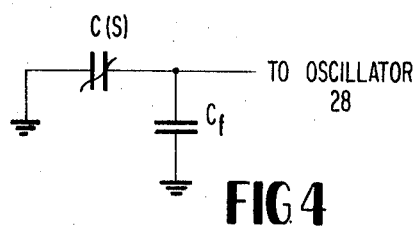
FIG. 4
INVENTOR
EUGENE R. LUCKA
BY L. Blanc & Shur
ATTORNEYS

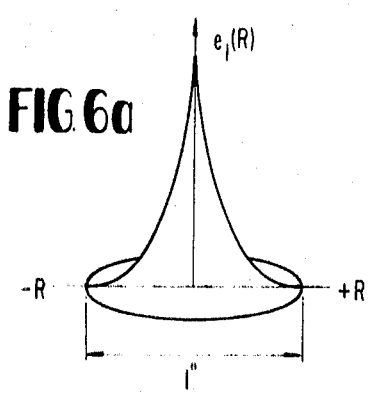
FIG.6a
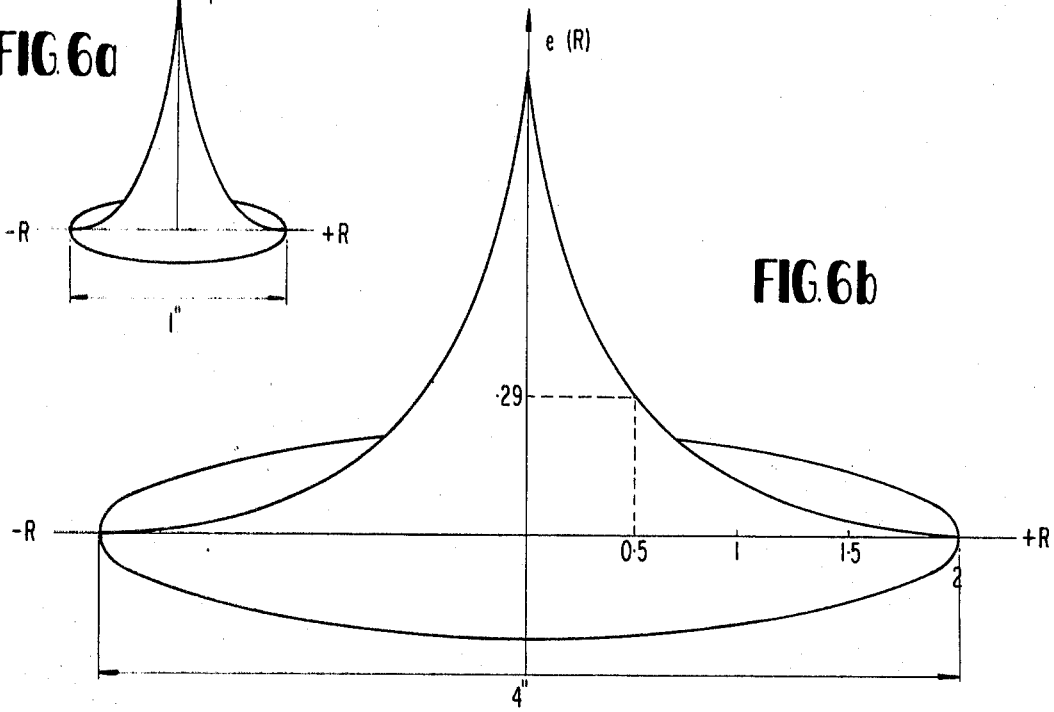
FIG.6b
FIG.6d
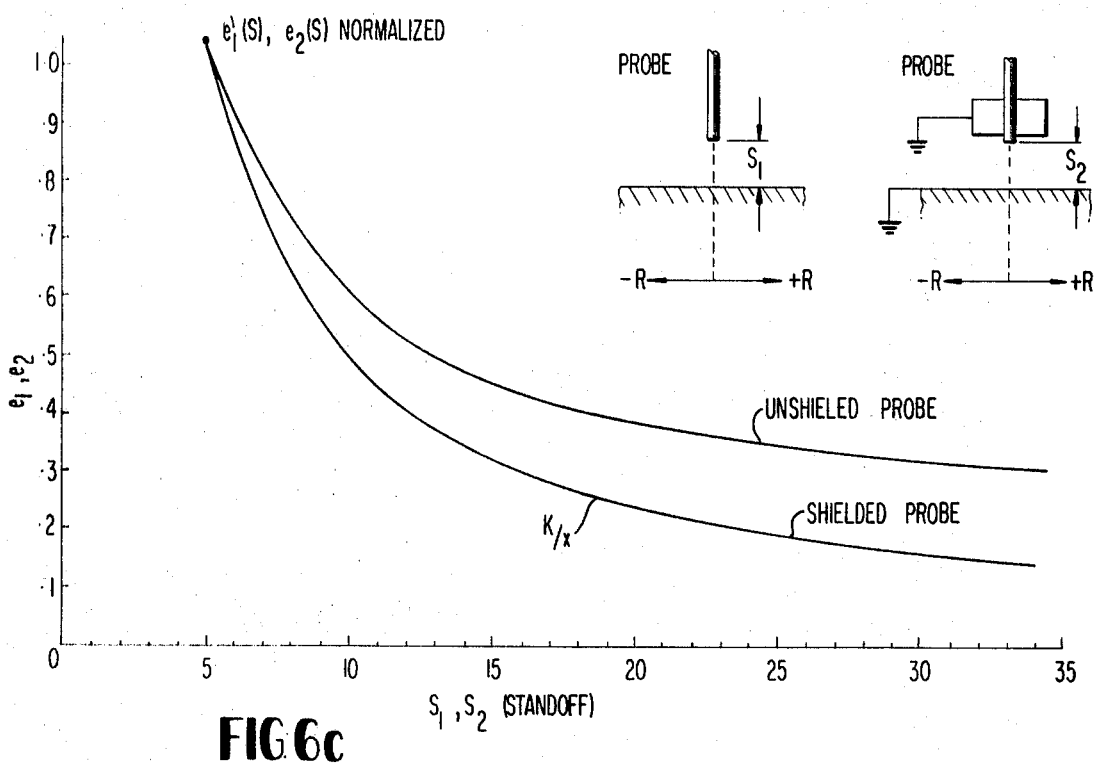
FIG.6c

DIRECTIONAL DISPLACEMENT CAPACITIVE PICKUP

The present invention relates to a noncontact proximity sensitive transducer system for dimension and displacement measurement having improved directional properties. Measuring equipment for this purpose has been known for many years. Early examples employed contact pickups, responsive to the position of the object under inspection, or its time derivative, and relied on the actual motion of the pickup element to produce a measurable electrical signal. Systems of this type, however, were subject to several disadvantages, including poor low frequency response, dynamic range, etc. Often attachment of the sensing device to the object under inspection frequently disturbed the phenomenon being observed. Moreover, use of a contact pickup was undesirable in that the surface of the object was subjected to possible deflection or damage due to the physical contact.

As a result, noncontacting measurement systems were considered. However, substantial difficulties were encountered in the areas of calibration and standardization since noncontact transducers were found to be highly dependent upon environmental variations and inherent nonlinear sensitivity of the pickup elements employed.

Many of these difficulties hive been overcome by the employment of continuous calibration techniques such as disclosed in the present assignee's U.S. Pat. No. 3,180,136, in the name of George B. Foster, entitled "Continuously Calibrated Displacement Measuring Transducer System," and in copending U.S. application, Ser. No. 672,602, filed Oct. 3, 1967, in the name of George B. Foster, and entitled "Surface Interruption Calibrated Noncontact Transducer System."

Briefly, according to the technique of the aforementioned Foster patent, a pickup, sensitive to energy variations in space is positioned, close to, but not in contact with the object under inspection and is subjected to a controlled cyclic variation in position relative to the object. System calibration is achieved by control of the overall transducer system gain, i.e., sensitivity, by comparison of the actual system response to the calibrating displacement with a reference or expected response.

The system of the aforementioned copending Foster application operates analogously, but, instead of the controlled cyclic variation of the transducer position in relation to the object under inspection, a calibration member having a regularly interrupted surface is attached to a rotating object under inspection to produce an apparent cyclic variation in the pickup-to-object spacing. Pickup response uniquely associated with the apparent calibrating variation, e.g., at the surface interruption frequency, is employed to adjust the system sensitivity to produce the desired response to the known level of apparent calibrating vibration.

Such techniques produce excellent results under a wide variety of operational conditions whereby the concept of a noncontacting transducer system has been transformed from a mere laboratory phenomenon to a practical and useful measuring instrument. It has been found that the noncontact pickups employed in the systems disclosed in the aforementioned Foster patent and application are inherently quite omnidirectional in sensitivity. For a pickup whose response is characterized by a capacitance which varies as a function of the pickup-to-object spacing, this means that the pickup will respond not only to the positional variations under inspection (ordinarily in the longitudinal direction), but to other positional variations, e.g., other than longitudinally. Frequently this is not objectionable, but occasionally may result in the masking in the desired phenomenon. In other instances, difficulty may result since the calibration of system sensitivity is only valid with respect to vibrations or displacements parallel to the calibrating displacement.

A practical result of the inherent nondirectional sensitivity is that the angular resolution of the pickup may be too low to permit accurate measurement of vibration or dimensional variation of small, closely spaced members, or where the surface under inspection is itself characterized by periodic surface profile interruptions. Such conditions would be encountered, for example, in production line inspection of dimensional accuracy of a turbine blade assembly. Here close proximity of adjacent blades may result in substantial reduction of system resolution, with consequent inability to measure accurately the turbine blade crown profile. Applicant's assignee has developed a system for achieving such production line monitoring of interrupted surfaces of this type. The system is disclosed in copending U.S. Pat. application Ser. No. 670,975, filed Sept. 27, 1967, in the names of George B. Foster and Eugene R. Lucka, entitled "Noncontact Interrupted Surface Inspection."

The present invention is intended as an adjunct to the Foster-Lucka system and serves to provide substantial improvement in pickup resolution.

Briefly, in accordance with this invention, a proximity-sensitive pickup in the form of a thin elongated rod is provided with an annular shielding member fitted onto its end. The shielding member is provided with a conductive surface electrically isolated from the pickup member and includes a suitable electrical contact whereby it may be established at the same electrical potential as the object under inspection. The tip of the pickup forms a distance-sensitive variable capacitance which can be functionally related to the probe-tip-to-object spacing. The variable capacitance serves to modulate the frequency of an oscillator output signal. This, in turn, is processed to provide a motion or dimension signal having its amplitude and frequency related to the amplitude and frequency of the phenomenon under inspection. Use of the conductive shielding plane positioned around the probe tip provides a substantial reduction of pickup sensitivity in directions other than longitudinally, with correspondingly improved angular resolution.

An additional benefit of the improved directionality and angular resolution is improved inverse distance sensitivity. As is known, the capacitance between two spaced bodies is related to some inverse power of the spacing X. For an ideal parallel plane capacitor, this is a simple $X^{11}$ relationship, and theoretically, such a relationship might be expected for capacitive pickups of the type employed herein. However, such a relationship is not obtained except at distances which are quite small in relation to the transverse dimensions of the pickup. Use of the shielding member in accordance with this invention results in more than a four-fold increase in the spacing at which the $X^{11}$ relationship is maintained compared to an identical but unshielded pickup.

Accordingly, it is a general object of this invention to provide an improved pickup for a noncontact displacement transducer.

It is also an object of this invention to provide an improved noncontact displacement transducer having substantially improved directional sensitivity.

It is another object of this invention to provide an improved noncontact displacement transducer with a pickup having low sensitivity in directions other than along its longitudinal axis.

It is a further object of this invention to provide an improved noncontact displacement transducer adapted for measurement of the surface profile of a rotating interrupted surface or the equivalent.

It is another object of this invention to provide a noncontact proximity-sensitive pickup having improved lateral resolution.

It is a related object of this invention to provide an improved noncontact proximity-sensitive pickup comprising an elongated thin rod with a shielding member surrounding the pickup tip.

It is a further related object of this invention to provide an improved noncontact pickup having a needlelike member with a shielding surface around its tip extending in a plane normal to the pickup axis, and having a conductive surface electrically insulated from the needlelike member and maintained at the same electrical potential as the object under inspection.

It is yet another object of this invention to provide an improved noncontact displacement transducer having an elongated needlelike pickup with a shielding member fitted onto the sensitive end of the pickup.

It is a related object of this invention to provide such a noncontact displacement transducer in which the shielding member is a disclike button formed of dielectric material with a diameter substantially greater than that of the needlelike member.

It is a further related object of this invention to provide such a noncontact displacement transducer in which the dielectric member is provided with an electrically conductive surface electrically isolated from the needlelike portion of the pickup and maintained at the same electrical potential as the object under inspection.

It is the further object of this invention to provide a noncontact displacement transducer having a shielded pickup as described above, and electrical circuitry including means for converting proximity-sensitive pickup output variations into a usable measuring signal representative of the phenomenon under inspection.

It is a related object of this invention to provide a noncontact displacement transducer having a shielded pickup as described above and associated electronic circuitry for converting proximity-sensitive pickup variations into a usable electrical signal and means responsive to a particular component of the signal to provide automatic continuous sensitivity calibration for the measurement signal.

The exact nature of this invention, together with other objects and advantages thereof will become apparent from the consideration of the following detailed description and the accompanying drawings in which:

FIG. 1 is a schematic diagram showing one embodiment of a noncontact displacement transducer in accordance with this invention;

FIG. 2 is a perspective drawing showing the shielded pickup of this invention in operative relationship to a rotating interrupted surface under observation;

FIG. 3 is a vertical sectional view showing the construction of the pickup-shielding member;

FIG. 4 is a fragmentary circuit diagram illustrating the electrical properties of the pickup of FIGS. 2 and 3;

FIG. 5 is a side elevation, partially in section, representative of the construction of a suitable pickup in accordance with this invention;

FIGS. 6a and 6b are three-dimensional sensitivity curves providing a comparison of the radial (i.e. off-axis) sensitivity of the pickup of this invention, and of a similar pickup but without the shielding member;

FIG. 6c is a graph showing the on-axis sensitivity as a function of the pickup-to-object spacing for the pickup of this invention, and of a similar pickup without the shielding member;

FIG. 6d shows the definition of the coordinates of FIGS. 6a—6c; and

FIG. 7 shows an electrical block diagram of a somewhat modified version of the electronic portion of the transducer system shown in FIG. 1.

FIG. 1 illustrates schematically a noncontact transducer system in accordance with the present invention. The arrangement shown is generally denoted at 10 and comprises part of a production-line-monitoring system intended to measure the surface profile of a turbine assembly, one stage of which is indicated at 12. Such a turbine stage ordinarily includes a plurality of blades 14 and a spool 16 suitable mounted and arranged to rotate on a shaft 18. The purpose of the system is to provide an accurate blade radius profile of the turbine stage during assembly to permit identification and replacement of blades which are oversized or undersized before the unit is placed in operation.

In a practical arrangement, such as shown in the aforementioned Foster and Lucka patent application, the entire multistage turbine structure is mounted on a suitable test stand and is rotated to permit rapid inspection of the entire surface profile. A separate pickup for each stage, and suitable electronic processing and display circuitry, is provided along with suitable synchronizing means to facilitate visual identification and marking of a particular blade which is to be replaced.

The essential features of noncontact transducer system 10 are a capacitive pickup 20 here illustrated as a slender elongated member 22 with an attached shielding member 24, coupled to an electronic signal processing system 26 including an RF oscillator 28 connected through a signal coupler 30 to an FM demodulator 32, and having an automatic frequency control circuit (AFC) 34, providing frequency control feedback from demodulator 32 to RF oscillator 28. The output frequency for oscillator 28 is controlled by a resonant feedback circuit including capacitive pickup 20.

The output of demodulator 32 is connected to suitable measuring equipment, indicated generally as a utilization device 36 which may include further signal-processing equipment, recording equipment, visual display means such as an oscilloscope, etc., as described in detail in the aforementioned Foster and Lucka patent application.

Briefly, the operation of the system described above is as follows:

The variation of the pickup-to-object spacing S causes changes in the capacitance of pickup 20, and correspondingly, of the resonant frequency of oscillator 20. The result is a frequency modulation of the oscillator output which is functionally related to variations in S.

Since the capacity variation of pickup 20 will be related to the actual variations in the pickup-to-object spacing (or, in the specific case illustrated, to the surface profile variations) the frequency deviation of the FM signal will also be related to the variations in S. Similarly, since the rate of capacity variation is determined by the rate at which S changes, the FM rate will also be determined by this parameter. These signal properties must be recovered from the oscillator output signal to permit further signal processing and actual measurement of the physical parameters being observed.

The modulated oscillator output is therefore connected through coupling circuit 30 to FM demodulator 32. The latter operates in conventional fashion to produce a low frequency displacement analog signal whose amplitude corresponds to the frequency deviation of the FM signal (i.e., the instantaneous value of S) and whose frequency corresponds to the FM rate (i.e., the rate of change of S). Thus the displacement analog provides an easily handled signal containing all of the information provided by pickup 20. This signal may then be processed further in any desired manner by utilization circuit 36.

FIG. 2 shows the construction of noncontact pickup 20 in some detail, and indicates the proper operative relationship between the pickup and the object 12 under inspection. Pickup member 22 is preferably a rigid electrically conductive wire of sufficient diameter to be self-supporting when assembled with shielding member 24. Conductive member 22 projects from a suitable base, a portion of which is indicated at 38, positioned in operative relationship to object 12 under inspection. For surface profile analysis as described herein, pickup 20 is positioned a suitable distance S (see FIG. 1) from turbine stage 12. The latter is then rotated so that successive ones of blades 14 pass within the field of sensitivity of the pickup.

For successful operation, the sensitivity of pickup 20 should be quite low except in the direction of pickup elongation, i.e., axially of elongated member 22. If the off-axis or radial sensitivity is not low, variation in the distance S will not accurately be measured since portions of the object under inspector other than that axially aligned with member 22 will affect the pickup electrical response. As previously pointed out, the present invention serves to assure low off-axis sensitivity and accurate operation.

To this end, shielding member 24, the construction of which is illustrated in detail in FIG. 3, is positioned on elongated member 22 at the end closest to object 12 under inspection. Shielding member 24 is of generally cylindrical configuration and comprises a dielectric body portion 40 formed of ceramic, epoxy, or other like material of suitable character. Body 40 includes a sloping upper face surface 42 with a raised central boss 44, a generally cylindrical side surface 46, and a flat circular bottom surface 48. A circumferential groove 50 of small depth and width, e.g., about 30 mils in each dimension, is cut into cylindrical side portion 46 of dielectric member 40. An axial central aperture 52 extends the entire height of body 40 through boss 44 and is of proper diameter so that shielding member 24 may be press fitted onto the end of elongated pickup member 22.

An electrically conductive coating 54 is applied to upper face surface 42 and cylindrical side surface 46 of body 40. Conductive coating 54 may be applied in any suitable manner; preferably, a silver layer is painted directly onto the dielectric body. Alternatively, a conductive foil may be cemented or otherwise secured directly to the surface of the dielectric material. An electrical connection for conductive surface 54 is provided by means of a conductive strap 55 which is received in a circumferential groove 50( (see FIG. 2). A small radial bore 56 (see FIG. 3) is provided in groove 50 and receives a pin or other suitable means serving to secure strap 55 to dielectric body 40 and to provide a terminal for attachment of a lead wire. As previously mentioned, the conductive coating 54 on shielding member 24 is preferably maintained at the same electrical potential as the object 12 under inspection. Alternatively, a potential difference may be present but must be maintained at a constant value independent of pickup-to-object spacing. As a practical matter, this is normally accomplished by maintaining both the conductive surface and object under inspection at ground potential as indicated schematically in FIGS. 1 and 2.

Since object 12 and conductive surface 54 are at like potential or at least, at constant potential relative to each other, it is necessary to maintain both electrically isolated from conductive member 22 if an electrical capacitance is to be established with the latter. This may be accomplished in several ways; the preferred method is terminate the conductive coating on face surface 42 of dielectric body 40 at the vertical side 58 of boss 44. Accordingly, when conductive member 22 is fitted into bore 52, no conductive path exists over flat face 60 of boss 44 to conductive surface 54.

The diameter of boss flat surface 60 and the height of side 58 should be small in relation to the diameter. Also, when assembled, elongated member 22 should terminate flush with boss surface 60 since it is found that better shielding and improved directional properties are achieved in this manner.

Other cross-sectional dimensions of shielding member 24 will normally be optimized for a particular application. For example, sloping face 42 is disposed at an angle of about 6° for use in the Foster-Lucka Turbine Measuring System, but other angles may be found to be more satisfactory for other applications.

The total height and diameter of shielding member 24 will also depend on the system application. The height of the shield may be quite short if no moving conductive surfaces are present along the length of member 22. However, if necessary, dielectric body 40 and shielding surface 54 may be lengthened to provide increased side shielding.

As may be understood, conductive surface 54, dielectric body 40 and conductive member 22 cooperate to form a capacitor due to the electric isolation of the conductive elements. Since conductive surface 54 will normally be at ground potential, there results a fixed shunt capacitance to ground from pickup member 22, the value of which depends upon the geometry of the dielectric body 40, as well as on the particular dielectric material chosen. For a given overall configuration of dielectric body 40, some control of the capacitance exhibited between pickup members 22 and 24 is achieved by provision of a central bore 62 and an axial groove 64 cut into dielectric body 40 extending upwardly from lower flat surface 48. This has the effect of reducing the dielectric constant of body 40 and, correspondingly, the capacitance between shield 24 and probe member 22.

The fixed shunt capacitance and the pickup capacitance are illustrated schematically in FIG. 4. Here, the capacitor C(S) represents the capacity between pickup member 22 and object 12 under inspection, while the capacitor $C_f$ represents the capacitance between pickup member 22 and shield 24. Due to inevitable geometric constraints, the fixed shunt capacitance $C_f$ will be substantially larger than the variable distance-sensitive capacitance C(S). On the other hand, the additive effect of parallel capacitors simply increases the center or average value about which the total input capacitance to oscillator 28 (see FIG. 1) varies in response to changes in the distance S. Since C(S) is itself quite small in relationship to fixed capacitance $C_f$, the latter reduces overall system sensitivity, but introduces no other detrimental effect on system operation. While there is a loss of initial sensitivity, it is more than compensated for by the greatly improved directional properties of the shielded pickup as amplified hereinafter.

A pictorial representation of a practical embodiment of the above described pickup, as shown in FIG. 5, comprises a metal casing 66 having a pair of cavities 68 and 70 containing the various pickup components described below. Elongated conductive member 22 of the pickup protrudes from casing 66 as shown, and terminates at its lower end in a radially enlarged, externally threaded supporting shank 72. The latter is received in a complementary internally threaded conducting insert 74 fitted into cavity 68 in pickup casing 66. Electrical isolation of conductive member 22 and shank 72 from the casing is provided by an insulating tubular insert 76 fitted into cavity 68 separating conducting insert 74 from the body of casing 66. An insulating spacer 78 and a locking nut 80 are positioned on threaded shank 72 as shown so that conductive member 22 may be raised or lowered in relationship to pickup body 66 and locked in place by tightening nut 80. This permits a fine adjustment of the pickup-to-object spacing S after installation of the pickup.

Best results have been obtained if at least a portion of the electronic circuit 26 illustrated in FIG. 1 is in close proximity to pickup sensing member 22. Thus, a circuit board 82, or other suitable means for mounting electronic circuitry, is positioned in cavity 70 and serves to support the desired portion of the electronic circuit.

Actual coupling of pickup element 22 to the electronic circuitry on circuit board 82 is achieved by means of an insulated wire 84 soldered or otherwise secured to conductive insert 74 in housing 68 and extending through a small passage 86 between cavities 68 and 70.

At least RF oscillator 28 and coupler 30 should be mounted in pickup 22 since the extremely small variations of the pickup capacitance C(S) would be well below the noise level of random stray capacitance and cable capacitance if an attempt were made to connect sensing element 22 to oscillator 28 through a cable of even moderate length. In addition, to facilitate coupling to the remainder of circuit 26, e.g., by low impedance cable, coupler circuit 30 which may be an impedance-converting circuit such as an emitter follower is provided in pickup 22 as an output buffer for RF oscillator 28.

Oscillator 28 may be of any suitable or desired construction but is preferably a Colpitts-type oscillator having the proximity-sensitive pickup capacitance connected as part of the frequency-determining circuit. As pickup capacitance varies with changes in pickup-to-object spacing, the resonant frequency of oscillator 28 is modulated, with the frequency deviation being determined by the pickup-to-object spacing, and the rate of modulation being determined by the character of the surface interruption being observed. For a rotating turbine blade assembly, as illustrated in FIGS. 1 aNd 2, the modulation rate would be the product of the shaft revolutions per second, and the number of blades. The modulated output of oscillator 28, after suitable impedance conversion, is coupled to the remainder of the circuitry not housed within pickup casing 66 by means of a suitable low impedance-shielded cable 31, as illustrated in FIGS. 1 and 5.

The actual configuration chosen for pickup member 22 and shielding member 24 is determined by the dimensions and character of the object under inspection and also by the resolution desired for the system. Among the parameters to be considered in pickup design are the diameters and axial dimensions of pickup members 22 and 24, the axial projection of pickup member 22 above conductive surface 54, the cross-sectional configuration of shielding member 24, and the average pickup-to-object spacing. Proper relationship between all of the foregoing factors, and the geometry of the object under inspection, is necessary to achieve optimum results in a given application. A detailed discussion of the pertinent considerations, as to the pickup per se, for turbine surface profile inspection will be found in the aforementioned Foster & Lucka patent application. For the most part, the general aspects of the discussion presented therein are fully applicable to design of shielded pickups and the pertinent portions of the Foster and Lucka application are incorporated herein by reference.

Comparison of pickup performance with and without shielding member 24 may be seen in FIGS. 6a—6d. FIGS. 6a and 6b represent the radial (off-axis) sensitivity functions $e_1(R)$ and $e_2(R)$ for the shielded pickup of the present invention and an identical but unshielded pickup, respectively at a given pickup-to-object spacing S. FIG. 6c shows the on-axis sensitivity $e_1(S)$ and $e_2(S)$ for the shielded and unshielded pickups respectively, i.e. at $R=0$. The definition of coordinates shown in FIG. 6d. For convenient comparison, the curves for FIGS. 6a and 6b are drawn to the same scale.

Also, for convenience, the sensitivity functions $e_1(S)$ and $e_2(S)$ are shown normalized against a maximum value corresponding to a minimum pickup-to-object spacing S chosen arbitrarily as B 6 mils.

As may be observed in FIG. 6a and 6b, the maximum value of $e_1(R)$ at $R=0$, i.e., on-axis, for the shielded pickup (FIG. 6a) is only about 50 percent of the value of $e_2(R)$ at $R=0$ for the unshielded pickup (FIG. 6b). This is due to the fixed shunt capacitance $C_f$ between pickup member 22 and shielding member 24. As mentioned in connection with FIG. 4, this constitutes a minor disadvantage, but is more than offset by the fact that $e_1(R)$ for the shielded pickup is much smaller and falls off much more rapidly for a given value of R than $e_2(R)$ for the unshielded pickup.

For example, FIG. 6a and 6b show $e_1(R)$ and $e_2(R)$ for a pickup-to-object spacing S of approximately 12 mils. Here, for $R=\pm0.5$ inch $e_1(R)$ is down to less than 1 percent of the value at $R=0.0$ inch (FIG. 6a). In contrast, FIG. 6b indicates that for $R=\pm0.5$ inch, $e_2(R)$ is still at a value approximately 29 percent of value at $R=0.0$. inch. Moreover, $e_2(R)$ does not fall below 1 percent of the on-axis value until $R=\pm2.0$ inches. Correspondingly, an increase in pickup-to-object spacing S not only reduces the overall sensitivity, but magnifies the actual values of R at which objects affect the pickup sensitivity.

The practical significance of the foregoing may be appreciated in connection with the turbine blade profile measuring system of the aforementioned Foster and Lucka application. Here, blade profile variations as small as ±200 microinches must be measured on turbine blades having a thickness of about 40 mils and a blade separation of about one-half inch. For the unshielded pickup, FIG. 6b clearly shows that adjacent blades, the surface of the turbine spool 16, and even portions of adjacent rotor stages may strongly influence the output of a given pickup, significantly reducing the potential accuracy available with the system.

In contrast, FIG. 6a shows that the shielded pickup provides substantially no off-axis response for values of R on the order of the blade-separation distance whereby significant increases may be achieved in system accuracy.

In addition to the obvious advantage of improved accuracy, several less obvious benefits are also obtained. For example, the pickup side response $e(R)$ is found to depend not only on the pickup-to-object spacing S but also on the diameter of the sensitive pickup member 22. For an unshielded pickup, it is found that the ratio of the probe diameter to the transverse dimensions or distances to be resolved (e.g., in the Foster-Lucka system, the blade thickness) should not exceed about 0.5 for high lateral resolution, i.e., ability to measure accurately axial variations over a small radial distance. With the shielded probe, this requirement can be relaxed to the extent that a unity or greater ratio will often produce satisfactory results. This advantage is most significant where transverse dimensions of the surface under inspection are quite small because it has been found that probes having a diameter significantly less than about 20 mils may not possess sufficient rigidity for completely satisfactory operation under all circumstances. Thus, use of the shielded pickup obviates the need for extremely slender pickup members to obtain lateral resolution on the order of 20 to 40 mils or less.

A further advantage obtained by the use of shielding member 24 is the resulting improved character of the inverse distance sensitivity function. This may be appreciated from consideration of FIG. 6c in which the lower curve represents the axial sensitivity $e_1(S)$ of the pickup with shielding member 24 installed, while the upper curve represents the axial sensitivity $e_2(S)$ of the unshielded pickup. The curves are accurately plotted so that the functional character of the sensitivity curve may be obtained by inspection.

For the curve for the shielded pickup, it may be seen that the sensitivity function $e_1(S)$ closely obeys an inverse distance relationship, i.e.:

$$e_1(S)=KS^{11}$$

Pickups constructed in accordance with this invention with a 40-mil diameter for member 22 and a 500-mil (½ inch) diameter for shield 24 have been observed to be characterized by an inverse distance sensitivity for values of S as large as 50 mils, which is substantially in excess of the values of S typically measured with a pickup of these dimensions.

In contrast, the upper curve of FIG. 6c shows that sensitivity for the unshielded pickup definitely does not follow the inverse distance relationship characteristic of the shielded pickup. At best, the sensitivity for the unshielded pickup may be regarded as having approximately an inverse distance relationship for very small values of S, e.g., on the order of about 10 to 12 mils. An advantage of the accurate and constant inverse-distance characteristic is that the same pickup sensitivity function is obtained for both large and small values of the distance S, thereby facilitating calibration and linearization procedures.

In the foregoing, principal emphasis has been placed on use of the shielded pickup for interrupted surface profile analysis as typified by production line monitoring of a turbine blade assembly. However, because of the considerable benefit of the present invention in reducing radial pickup sensitivity and in providing improved lateral resolution, shielded pickups constructed in accordance with this invention may advantageously be employed in other types of noncontact transducer systems such as shown and described in the aforementioned Foster U.S. Pat. No. 3,180,136.

An embodiment of the present invention employing a shielded pickup in a continuously calibrated transducer system of the latter type is shown in FIG. 7.

This embodiment generally denoted at 10' comprises a shielded pickup 20 of the type previously described, adapted to be axially vibrated for calibration purposes by a drive means 88 including an electrical oscillator 90 of fixed frequency $f_k$, and a suitable shake driver 92 coupled to a solenoid 94 surrounding a pickup support portion 96. Pickup driver 88 is operative to vibrate pickup 20 axially against a restraint schematically indicated at 98. As a result, the sensitive portion of pickup 20 is subjected to a continuous cyclic axial displacement relative to an object under inspection with a fixed peak-to-peak displacement from a nominal standoff distance.

The known characteristics of the calibrating vibration, i.e., its frequency $f_k$ and its fixed amplitude are employed as described below to achieve continuous control of system sensitivity while at the same time providing high lateral pickup resolution and directional sensitivity.

The output of pickup 20 is coupled into the frequency-determining circuit of an RF oscillator to provide frequency modulation representative of variations in the pickup-to-object spacing. For simplicity, the RF oscillator, and the remaining portions of the signal-processing circuitry described above in connection with FIG. 1, (except for utilization device 36) are denoted generally as FM translator circuit 100, and operate precisely in the manner previously described.

As will be recalled, the pickup signal output, as represented by the displacement analog signal contains components corresponding to changes in pickup to the amplitude and frequency of varions in space S. For a pickup being driven for calibration purposes, as illustrated in FIG. 7, a component corresponding to the calibration frequency $f_k$ is also present.

This signal may be extracted for use in system calibration by the gain control circuit generally denoted at 102. The latter includes a variable gain amplifier 104, a calibration frequency filter 106, a detector circuit 108, a comparator circuit 110, and a calibration reference signal generator 112.

To insure uniqueness of the calibration signal in relation to the various vibration or displacement frequencies to be measured, the calibration frequency $f_k$ is normally selected to lie outside of the anticipated vibration or displacement frequency spectrum. Accordingly, calibration signal filter 106 is preferably a band-pass filter tuned to the calibration frequency. Alternatively, a high or low pass filter may be substituted.

The output of calibration signal filter 106 constitutes a signal representative of the system response to the known calibrating vibration and may be used as an input-to-gain control system 102 for adjusting system gain to produce the desired response at all frequencies of interest. Thus, the filter output is connected to detector circuit 108 of conventional construction, including a rectifier circuit and low pass filter to provide a measurement of the peak or average value of the system response to the calibration frequency signal. The detector output is coupled to comparator circuit 110 which may be a difference amplifier or the like. A second input to comparator 110 is provided by calibration reference source 112 so that the comparator output represents the difference between the desired system response to the calibrating vibration and the actual response. The difference signal is coupled as a gain control signal for control amplifier 104.

In this way, system response is continuously adjusted on the basis of the response to a single signal of known characteristics to produce proper system operation independent of the average standoff distance, variation in which grossly affects system sensitivity. Also, calibration is obtained independent of environmental variations and the like which produce more subtle but equally deleterious changes in system response and accuracy.

As a further embodiment, it will be recalled that the transducer system of the aforementioned Foster application, Ser. No. 672,602 also provides continuous calibration generally in the manner described above, but relies on an apparent variation in the pickup-to-object spacing produced by an interrupted surface calibration member such as a gear mounted on a rotating portion of the object under inspection. Here, as in the case of the vibrating pickup embodiment of FIG. 7, the pickup output signal includes a component at the surface interruption frequency characteristic of the calibrating member. This may be extracted by means of a suitable calibration signal filter and utilized for continuous calibration in the manner previously described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

What I claim and desire to be secured by United States Letters Patent is:

1. A directional proximity-sensitive pickup for use in a noncontacting transducer system comprising: sensing means adapted to be positioned in spaced relationship with an object to be inspected, said sensing means and said object cooperating to form an electric energy storage device, the energy storage characteristics and variations thereof in said energy storage device being a function of the spacing in a first direction between said sensing means and said object, and also being a function of the spacing between said sensing means and other objects in space in at least one other direction; and means cooperating with said sensing means to render said pickup substantially directional, including shielding means disposed about said sensing means to reduce substantially the effect of said energy on said pickup response, except in said first direction, said shielding means being comprised of a thin body of electrically conductive material and isolating means exhibiting an electrical conductivity which is substantially less than that of said shielding means, said isolating means separating said shielding means and said sensing means, said shielding means and said isolating means extending around said sensing means in said other direction from a position close to said sensing means to a distance substantially exceeding the extent of said sensing means in said other direction to define an extended shielding surface separating said sensing means from said object with an opening therein slightly larger than the extent of said sensing means in said other direction through which said sensing means and said object are exposed to each other.

2. A directional pickup as defined in claim 1 wherein said sensing means comprises an electrically conductive self-supporting rod elongated in said first direction, and wherein said isolating means comprises a member having a low dielectric constant, said member having an aperture therein for receiving said conductive rod with one end thereof exposed to said object under inspection.

3. A directional pickup as defined in claim 2 wherein the diameter of said rod is between about 0.5 and 1.0 times the minimum distance in said other direction to be resolved by the transducer system in which said pickup is to be employed.

4. A directional pickup as defined in claim 2 wherein said shielding means comprises a thin coating of material covering said dielectric member, said member including a portion for electrically insulating said conductive rod from said conductive layer; and means for establishing a fixed electrical potential between said shielding means and said object under inspection whereby said pickup exhibits a fixed capacitance between said sensing means and said shielding means, and a variable capacitance between said sensing means and said object, the value of the variable capacitance being related to the spacing S between the object and said sensing means in said first direction by a 1/S function for all values of spacing of interest.

5. A directional pickup as defined in claim 4 wherein said conductive layer is a coating of silver paint.

6. A directional pickup as defined in claim 4 wherein said dielectric body exhibits a low dielectric constant, comparable to that of epoxy resins.

7. A directional pickup as defined in claim 4 wherein said means for electrically insulating said conductive rod from said conductive layer includes a region on the surface of said dielectric body surrounding said one end of said rod, said region being free of said conductive shielding layer.

8. A directional pickup as defined in claim 4 wherein said dielectric body is of a generally solid cylindrical configuration having an axial bore for receiving said conductive rod with the extreme axial end portion thereof exposed to said object under inspection, and wherein said means for electrically insulating said conductive rod from said conductive layer comprises a boss extending axially from said isolating means body defining the end of said axial bore adjacent the end portion of said conductive rod, said boss being free of said conductive coating.

9. A directional pickup as defined in claim 1 wherein said sensing means includes an electrically conductive surface adapted to be placed proximate said object under inspection; and wherein said isolating means includes a nonconductive body having a passage therein receiving said sensing means, with said conductive surface exposed to said object under inspection.

10. A directional pickup as defined in claim 9 wherein said shielding means comprises a thin metallic coating on said nonconductive body; said body including a portion for electrically insulating said conductive element from said metallic coating, and means adapted to maintain a fixed electrical potential between said metallic coating and said object under inspection.

11. A directional pickup as defined in claim 9 said shielding means is disposed on said nonconductive body, and wherein the thickness of said shielding means is less than any other dimension of said pickup.

12. A directional pickup as defined in claim 9 wherein the dimension of said surface in said other direction is at least one-half the minimum transverse distance to be resolved by the transducer system.

13. A directional proximity-sensitive pickup as defined in claim 1 wherein said sensing means comprises a slender rigid metal rod; wherein said isolating means comprises a body of dielectric material having a generally solid cylindrical configuration with an axial bore therein for receiving a portion of said rod with one end thereof exposed to said object under inspection; and wherein said shielding means comprises a thin metal layer on the axially extending surface of said dielectric body and on the laterally extending surface thereof adjacent said end of said rod, except in the immediate region of said bore, thereby providing electrical insulation between said rod element and said conductive layer.

14. A directional pickup as defined in claim 13 wherein said laterally extending surface of said body is of conical configuration, tapering outwardly toward the center and terminating in a central boss defining one end of said axial bore, the surfaces of said boss being substantially free of said metal layer, thereby providing said electrical insulation between said metal layer and said rod.

15. A directional pickup as defined in claim 14 wherein portions of said solid dielectric body are removed to reduce the dielectric constant of said isolating means.

16. A directional pickup as defined in claim 15 wherein the diameter of said rod is at least one-half the minimum transverse distance to be resolved by the transducer system.

17. A noncontact displacement transducer system comprising: a pickup having substantially unidirectional sensitivity to change the spacing S in a given direction between the pickup and an object under inspection, said pickup comprising a sensing member, and shielding means extending in a direction lateral to said given direction to form an extended ground plane around said sensing member separating said sensing member from said object except in a limited region defined by an opening in said ground plane slightly larger than the extent of said sensing member in said lateral direction; said pickup having an electrical parameter which is a 1/S function of the spacing S in said given direction for all values of spacing of interest; circuit means coupled to said sensing means to produce an analog signal representative of said 1/S functional relationship; and measuring means for extracting from said analog signal a measure of said variations.

18. A noncontact transducer system as defined in claim 17 wherein said sensing member and said object under inspection form an electric energy storage device, whereby said electrical parameter is a capacitance which varies inversely with pickup-to-object spacing in said given direction, and wherein said circuit means provides a signal related to said capacitance; said circuit means including an oscillator having said sensing member coupled thereto as a frequency determining element, whereby the output of said oscillator is frequency modulated in accordance with said variations in pickup-to-object spacing in said given direction.

19. A noncontact displacement transducer system as defined in claim 18 wherein said circuit means further includes means coupled to said oscillator for demodulating said frequency modulated oscillator output to produce said analog signal.

20. A noncontact displacement transducer system as defined in claim 17 wherein said measuring means comprises an amplifier having signal-responsive means for adjusting the amplifier gain; means connected to the output of said amplifier and responsive to a limited portion of the amplifier output signal spectrum; and means responsive to the signal amplitude in said limited spectrum portion for producing a signal for varying the gain of said amplifier means.

21. A noncontact transducer system as defined in claim 20 further including means coupled to said pickup for imparting a vibration of controlled amplitude and frequency to said sensing means as a calibrating vibration; and wherein said means responsive to said limited spectrum portion comprises a filter responsive to signals at the frequency of said calibrating vibration, and wherein said amplitude-responsive means includes means for comparing the amplitude of the signal at the frequency of the calibration vibration with a reference signal to provide a gain control signal to said amplifier, said gain control signal being representative of the difference between the actual signal amplitude at the calibration frequency and the reference signal amplitude.

UNITED STATES PATENT OFFICE
CERTIFICATE OF CORRECTION

Patent No. 3,593,127                              Dated July 13, 1971

Inventor(s)   EUGENE R. LUCKA

It is certified that error appears in the above-identified patent and that said Letters Patent are hereby corrected as shown below:

In Column 2, lines 41 and 48, "$X^{11}$" should read $X^{-1}$.

In Column 3, line 66, "suitable" should read --suitably--
Column 4, line 69, "inspector" should read --inspection--.
Column 5, line 23, "groove 50(" should read --groove 50--.
Column 6, line 71 "aNd" should read --and--.
Column 7, line 31, "shown" should read --is shown--.
Column 7, line 36 "as B 6 mils" should read --as 6 mils--.
Column 8, line 31, the equation reading $$"e_1(S) = KS^{11}"$$

should read $$--e_1(S) = KS^{-1}--.$$

Signed and sealed this 25th day of January 1972.

(SEAL)
Attest:

EDWARD M. FLETCHER, JR.          ROBERT GOTTSCHALK
Attesting Officer                Commissioner of Patents